(12) United States Patent
Janssen et al.

(10) Patent No.: US 9,531,713 B2
(45) Date of Patent: Dec. 27, 2016

(54) METHOD AND SYSTEM FOR ENABLING AND DISABLING EXECUTION OF COMPUTER INSTRUCTIONS

(71) Applicant: Real Enterprise Solutions Development B.V., 'S-Hertogenbosch (NL)

(72) Inventors: Bob Janssen, Lage Zwaluwe (NL); Patric Johannes Schepens, Helmond (NL); Dennis Anton Edwin Smits, Beek en Donk (NL)

(73) Assignee: REAL ENTERPRISE SOLUTIONS DEVELOPMENT B.V., 'S-Hertogenbosch (NL)

( * ) Notice: Subject to any disclaimer, the term of this patent is extended or adjusted under 35 U.S.C. 154(b) by 0 days.

(21) Appl. No.: 14/066,093

(22) Filed: Oct. 29, 2013

(65) Prior Publication Data

US 2014/0123241 A1  May 1, 2014

(30) Foreign Application Priority Data

Oct. 30, 2012  (EP) .................................... 12190667

(51) Int. Cl.
| | |
|---|---|
| G06F 7/04 | (2006.01) |
| G06F 15/16 | (2006.01) |
| G06F 17/00 | (2006.01) |
| H04L 29/06 | (2006.01) |
| G06F 21/62 | (2013.01) |

(52) U.S. Cl.
CPC ....... *H04L 63/0884* (2013.01); *G06F 21/6218* (2013.01); *G06F 21/6227* (2013.01); *G06F 2221/2113* (2013.01); *G06F 2221/2141* (2013.01); *G06F 2221/2145* (2013.01)

(58) Field of Classification Search
CPC .................................................... H04L 63/0884
USPC ................................................ 726/4, 27, 28
See application file for complete search history.

(56) References Cited

U.S. PATENT DOCUMENTS

| | | | |
|---|---|---|---|
| 7,493,528 B1 * | 2/2009 | Reichert et al. | 714/48 |
| 7,827,593 B2 * | 11/2010 | Smith | H04L 63/1408 709/220 |
| 8,726,343 B1 * | 5/2014 | Borzycki et al. | 726/1 |

(Continued)

OTHER PUBLICATIONS

Sandhu, RS et al, Access Control: Principles and Practice. IEEE Communications Magazine, vol. 32, No. 9, Sep. 1, 1994.

(Continued)

*Primary Examiner* — Morshed Mehedi
*Assistant Examiner* — Khalil Naghdali
(74) *Attorney, Agent, or Firm* — Steven M. Koehler; Westman, Champlin & Koehler, P.A.

(57) ABSTRACT

In a computer implemented method or system, users are enabled to associate usage rights with at least a first entity and a second entity. The first entity and second entity are selected from different ones of the module, a processing circuitry and the one or more files. Execution of the module is only enabled when the associated usage rights allow both use of the first entity by the second entity and use of the second entity by the first entity, i.e. mutual usage rights for at least two entities exist. Execution of the module is disabled when the associated usage rights prevent at least one of use of the first entity by the second entity and use of the second entity by the first entity.

15 Claims, 9 Drawing Sheets

(56) References Cited

U.S. PATENT DOCUMENTS

| | | | |
|---|---|---|---|
| 8,752,132 B2* | 6/2014 | Smith | H04L 63/1408 709/220 |
| 8,812,424 B2* | 8/2014 | Breiter et al. | 706/47 |
| 2007/0136603 A1* | 6/2007 | Kuecuekyan | 713/185 |
| 2009/0307706 A1* | 12/2009 | Jostmeyer et al. | 718/104 |
| 2010/0319067 A1* | 12/2010 | Mohanty et al. | 726/21 |
| 2011/0321135 A1 | 12/2011 | Dickerson | |

OTHER PUBLICATIONS

European Search Report from the Munich Patent Office for corresponding EP Application No. EP12190667.1 dated Apr. 23, 2013.

* cited by examiner

METHOD AND SYSTEM FOR ENABLING AND DISABLING EXECUTION OF COMPUTER INSTRUCTIONS

FIELD OF THE INVENTION

The disclosure generally relates to a computer-implemented method and a computer system for enabling and disabling execution of a module comprising one or more computer instructions configured to use one or more files. The computer system comprises a processing circuitry configured for executing the module and is configured to access the one or more files when executing the module.

BACKGROUND

The discussion below is merely provided for general background information and is not intended to be used as an aid in determining the scope of the claimed subject matter.

Information Technology (IT) infrastructures have become ever more complex over the last decade. At the same time, requirements on IT productivity and efficiency have also increased, resulting in a demand to reduce the number of manual steps needed to deliver IT services. One way to meet this demand is task automation for tasks that need to be performed frequently, e.g. on a daily basis.

RES Automation Manager meets this demand by pre-defining jobs performing one or more tasks in the IT infrastructure. Tasks may comprise information queries and/or managing of computers. The job contains one or more modules with computer instructions to execute the task. The computer instructions can be processed by a processing circuitry, e.g. an agent, that performs the task on a machine.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Embodiments of the invention are based on the recognition that the increased complexity of the IT infrastructure is also caused by multiple parties (users) participating and collaborating in the execution of tasks within the infrastructure to deliver IT services. In such systems, ownership of a processing circuitry (processing capacity), modules (one or more computer instructions) and resources (e.g. files) is not necessarily with the same party. The distribution of the ownership of these entities is expected to give rise to control issues over these entities for the parties involved.

Therefore, a solution is sought for that maintains the benefits from automated job execution while allowing each of the involved parties to exercise control over the entity or entities that is/are owned by them or is/are under their responsibility.

In one embodiment, a computer-implemented method for enabling and disabling execution of at least one module by the processing circuitry configured for executing the module is disclosed. The module comprises one or more computer instructions configured to use one or more files and the processing circuitry is configured to access the one or more files when executing the module.

The embodiment enables one or more users to associate usage rights with at least a first entity and a second entity. The first entity and second entity are selected from different ones of (a) the module, (b) the processing circuitry and (c) the one or more files. Execution of the module is only enabled when the associated usage rights allow both use of the first entity by the second entity and use of the second entity by the first entity, i.e. mutual usage rights for at least two entities exist. Execution of the module is disabled when the associated usage rights prevent at least one of use of the first entity by the second entity and use of the second entity by the first entity.

A further embodiment entails a computer system configured for enabling and disabling execution of at least one module by the processing circuitry configured for executing the module.

The computer system comprises an association component configured for associating usage rights with at least a first entity and a second entity, the first entity and second entity being selected from different ones of (a) the module, (b) the processing circuitry and (c) the one or more files. The system further has a usage verification component configured for enabling execution of the module when the associated usage rights allow both use of the first entity by the second entity and use of the second entity by the first entity and for disabling execution of the module when the associated usage rights prevent at least one of use of the first entity by the second entity and use of the second entity by the first entity.

The embodiments enable usage rights to be defined for the different entities that are to be used when performing a job. Usage rights for different entities may e.g. be defined by different parties, e.g. different organizations or different users within an organization. As an example, a first party having ownership of the first entity can define usage rights with respect to the use of that first entity by a second entity and, possibly, one or more further entities. Similarly, a second party having ownership of the second entity can define usage rights with respect to the use of that second entity by the first entity and, possibly, one or more further entities. Dependent on the mutual setting of the usage rights for the entities by the respective parties, the module will or will not be executed at the scheduled time at which the job containing the module is to be performed. In particular, only when both usage rights are mutually set to allow use of the entity by the other entity, the module will be executed. If at least one of the usage rights of an entity is set to not allow use by the other entity, the module will not be executed. In this manner, each party can control whether or not the entity he owns or is responsible for can be used by one or more entities owned by one or more other parties.

It should be appreciated that when a module cannot be executed due to the setting of the usage rights, either only that module will not be executed or an entire job containing the module will not be executed.

The verification of the usage rights is a mutual verification of usage rights between entities and may be performed in two separate threads to enhance performance.

In an embodiment of the method and system, access to the first entity is obtained by verifying a first access right assigned to a first user and access to the second entity is obtained by verifying a second access right assigned to a second user. The first access right and the second access right may be different access rights. In particular, the first access right of the first user is verified prior to accessing the first entity and defining usage rights for the first entity by the first user and the second access right of the second user is verified prior to accessing the second entity and defining the usage rights for the second entity by the second user. This embodiment enables distinguishing between respective owners of the entities by means of assigned access rights and only allowing the authorized users to define usage rights for their own entity.

In an embodiment at least one of the first entity and the second entity comprises a plurality of levels and the usage right associated with the entity applies to one or more of the levels. Usage rights may be defined for any of the levels. Usage rights may be inherited from other levels, e.g. from upper to lower levels.

In an embodiment, the levels of an entity can be configured by an (authorized) user, enabling the user to create a hierarchical level structure. Such a hierarchical structure may e.g. comprise a folder structure and usage rights may be defined by configuring the folder structure. By setting the usage rights in the structure of levels, distinctions may be created within a level or between levels regarding the application of the usage rights.

In one embodiment, usage rights set for a lower level override default user rights applying to one or more higher levels and inherited to lower levels of an entity.

In one embodiment, usage rights with respect to an entity are assessed starting from the lowest level upwards. In particular, the levels of the first entity comprise at least a parent level and a child level. Usage rights are first verified between the child level of the first entity and the one or more levels of the second entity to obtain a verification result. Only when the verification result indicates that the usage rights on the child level allow both use of the first entity by the second entity and use of the second entity by the first entity, usage rights between the parent level of the first entity and the levels of the second entity are verified.

In another embodiment, the number of levels of the first entity and the second entity is different. In order to obtain the verification result as soon as possible, it is beneficial to start the verification of usage rights from the entity with the lowest number of levels.

In yet another embodiment, the verification of the usage rights associated with the first and second entity is performed upon execution of the module. In this manner, last minute changes of the usage rights for one or more entities may still be effective.

Verification of usage rights may either be performed in the devices that run the module or in a device connected to the devices running the module (e.g. a dispatcher). Alternatively, both the devices running the module and one or more device connected to the module will verify the usage rights prior to executing the job.

The disclosed embodiments will be further be illustrated with reference to the attached drawings, which schematically show embodiments according to the invention. It will be understood that the invention is not in any way restricted to these specific embodiments. Hereinafter, embodiments of the invention aiming to alleviate the problem(s) described above will be described in further detail. It should be appreciated, however, that these embodiments may not be construed as limiting the scope of protection for the present invention. For instance, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
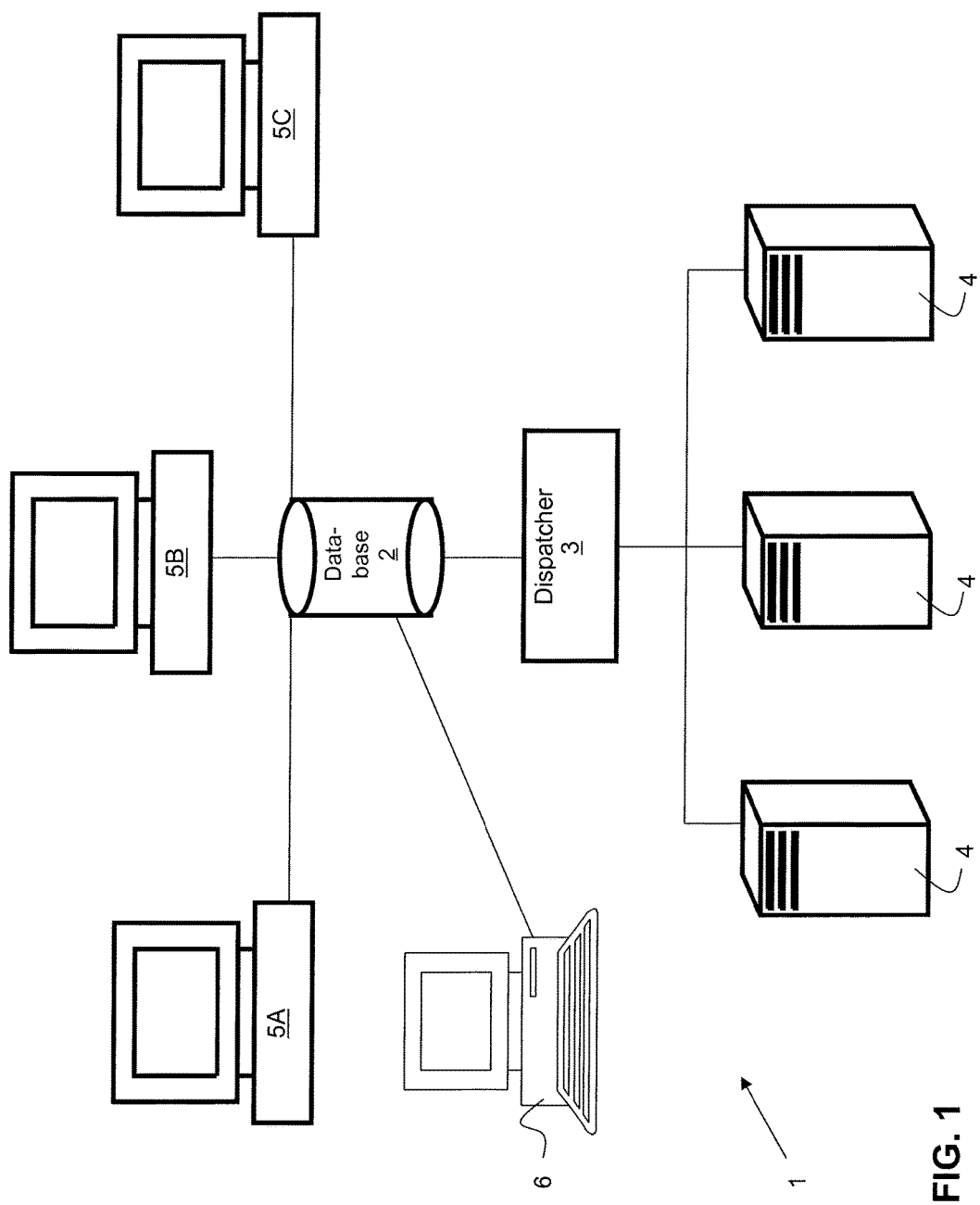
FIG. 1 is a schematic illustration of a computer system configured for executing the method in accordance with an embodiment of the invention.

FIG. 1 is a schematic illustration of an exemplary computer system 1 in accordance with an embodiment of the invention. The computer system 1 comprises a database 2 connected to a dispatcher 3. Dispatcher 3 is connected to a plurality of computers 4 and capable to exchange data between the database 2 and the computers 4. Dispatcher 3 can have a cache memory to store specific data from the database 2 for quicker access by computers 4 and decreasing the load on the database 2.

Computer system 1 furthermore comprises consoles 5A-5C that are configured for manipulating data and/or metadata applying to these data within the database 2 and that are assumed to be owned by different parties.

Computer system 1 comprises a further computer 6 from which jobs can be scheduled to be performed on computers 4. This computer 6 it typically used by the IT department of the organization providing IT services to computers 4.

Each of the computers 3, 5A-5C, 6 may contain a display, a processing circuitry, an operating system, a storage of or memory and a communication component. The processor enables processing required for the method and system described herein. The processing circuitry may include a computer processing unit or a microprocessor. The memory may be any physical, non-transitory storage medium configured to store data. The communication component enables a computer to communicate with other computers, e.g. over network comprising either wired or wireless networks.

The central database 2 stores a plurality of entities. One entity stored within database 2 are modules. A module contains one or more computer instructions that can be executed by any one of the computers 4. Database 2 also stores one or more files that may be used in (e.g. called by) a computer instruction in the course of executing the computer instructions. A third entity stored in the central database is the processing circuitry, e.g. an identification of the computer 4 (or a specific program thereon) that can execute the module(s) possibly using one or more files.

The IT department of the organization responsible for providing IT services for computers 4 may automate tasks to be performed by these computers 4 by scheduling these tasks as a job in database 2 using computer 6. Scheduling these tasks results in the execution of these tasks at the scheduled time. Dispatcher 3 regularly contacts database 2 and if a new job is available for a computer 4, the dispatcher 3 will automatically download all necessary data from the database 2 and store it. In turn, the computers 4 regularly contact dispatcher 3 and if a new job is available, the computer 4 will download the necessary data from the dispatcher 3 and perform the tasks of the jobs if allowed.

It should be appreciated that IT infrastructures in general are more complex than the computer system 1 depicted in FIG. 1. As one example, the computer system 1 may have more computers 4 and more dispatchers 3. Computers 4 may be connected to more than one dispatcher 3.

Furthermore, the functions of the various devices in FIG. 1 can be distributed over several devices or integrated within one or more devices. For example, a single console 5 can be used to manipulate the data and/or metadata within database 2 for multiple parties.

By default, the processing circuitry in the computers 4 is allowed to use all modules and all files when the computers 4 execute jobs. This behaviour is not always desirable in multi-tenant sits that serve multiple customers. In multi-tenant sites, parties often want to determine which entities may make use of their entity.

In an embodiment of the invention, usage rights may therefore be defined for entities in the database 2 determining whether or not the module will be executed.

Figure 2:
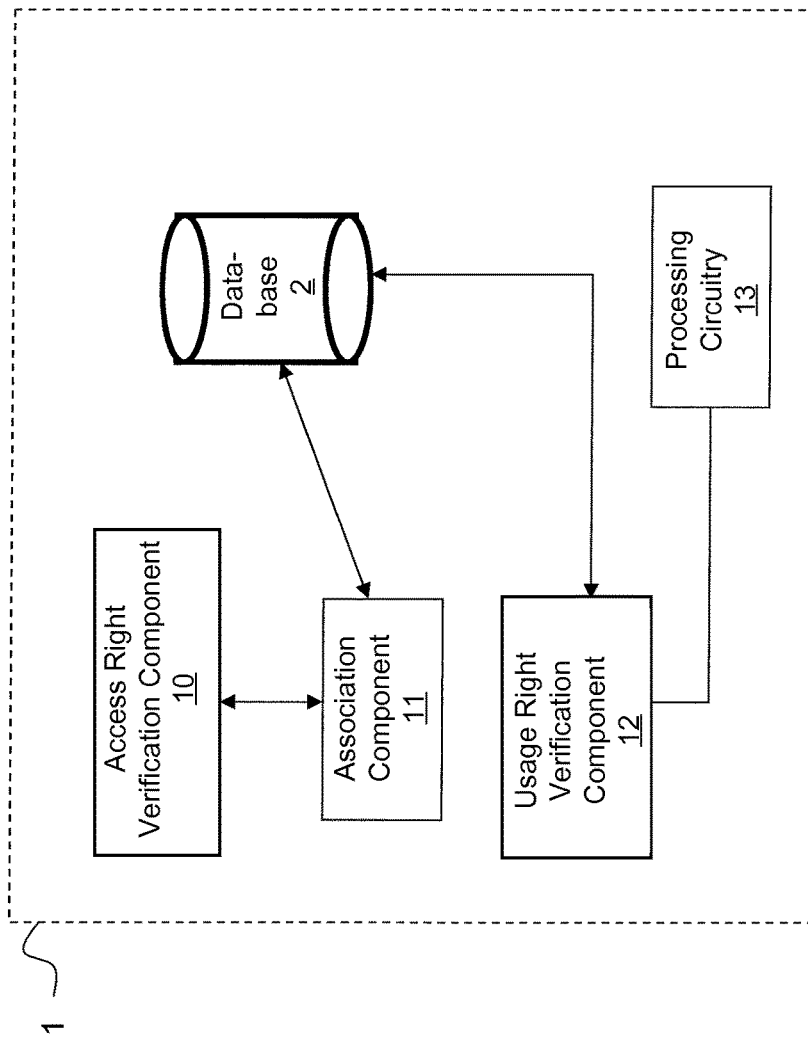
FIG. 2 is a schematic illustration of the computer system of FIG. 1 indicating some of the components used in executing the method in accordance with an embodiment of the invention.

FIG. 2 is a schematic overview of components of the computer system 1 capable of performing functions of the method according to an embodiment of the invention to enable defining usage rights. As mentioned above, the functions can be embodied within a single device or be distributed over a plurality of devices in the system 1.

An access right verification component 10 is provided in the system 1. The access right verification component 10 is configured to verify access rights of a user to one or more entities in the database 2. Only if a user is authorized to access an entity, the user can define usage rights with respect to that entity. Access rights for users may be stored anywhere in the system 1, for example in the database 2. As an example, a user intending to define usage rights for an entity will need to log in by providing credentials via a console 5A-5C in the system 1. Each of the entities in database 2 may have different access rights. The possession of access rights does not necessarily imply a permission to define all usage rights for a particular entity. An access right may also relate to a limited permission to e.g. only define certain usage rights.

An association component 11 is provided in the system 1 for associating usage rights with the entities in the database 2. The association component 11 is used by a user after being authorized. Users can associate usage rights with entities in the database 2 from their respective consoles 5A-5C. Usage rights can be associated with the entities via a user interface provided on the displays of the consoles 5A-5C.

A usage right verification component 12 is also provided in the system 1 and may e.g. be included in the dispatcher 3 and/or in the computer(s) 4. The usage right verification component 12 verifies whether the relevant entities have mutually allowed use of each other and determines on that basis whether or not a module can be executed by the computer(s) 4.

When the usage right verification component allows mutual use of the entities, processing circuitry 13 in computer 4 executes the module.

Figure 3:
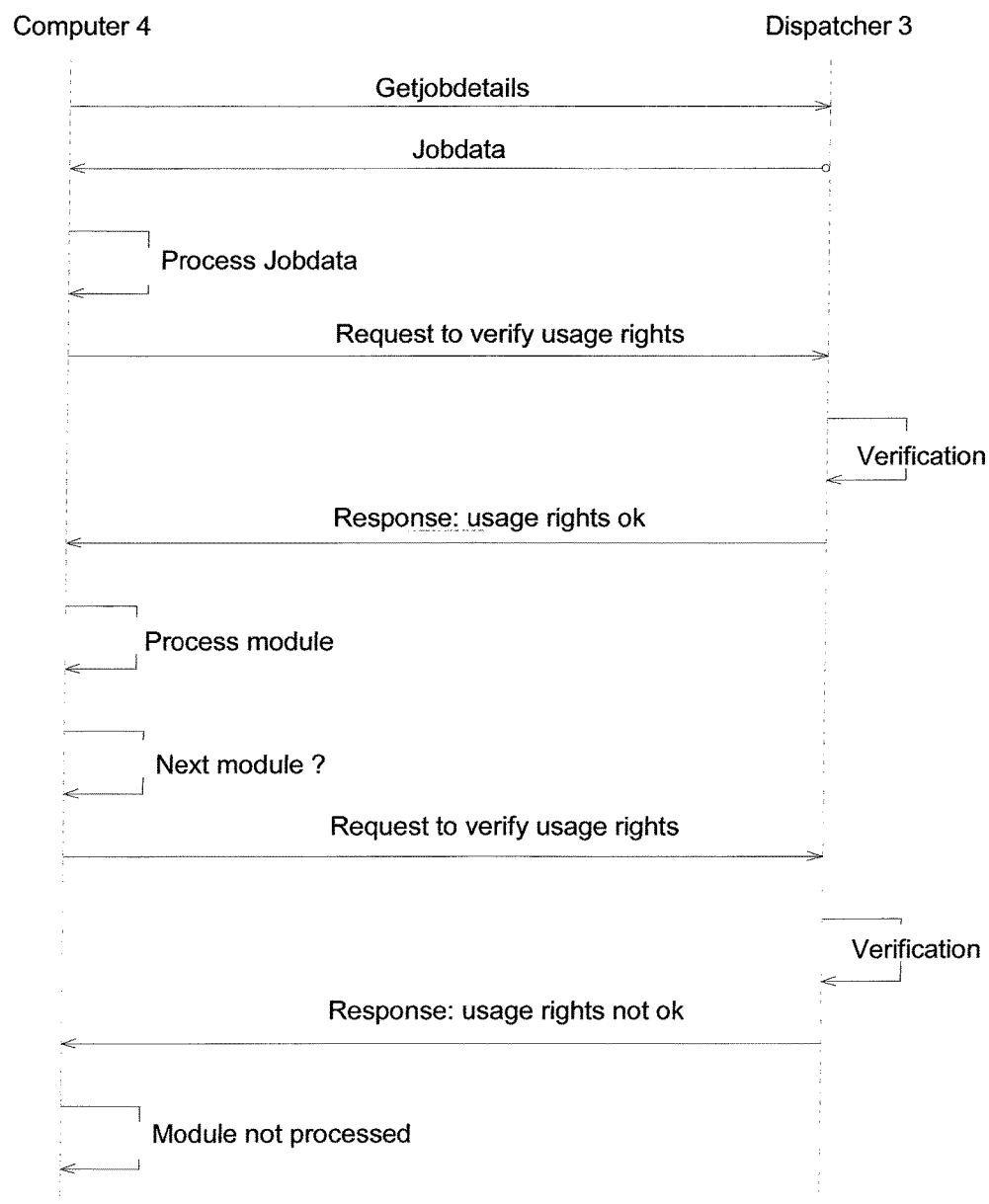
FIG. 3 shows a time chart of verification of usage rights in the system of FIG. 1

FIG. 3 provides a diagram of processing steps performed between the dispatcher 3 and a computer 4.

In a first step, the computer 4 polls the dispatcher 3 whether job data are available for the identified processing circuitry 13 in the computer 4. Dispatcher 3 provides data (e.g. computer instructions and flow logic of the modules) about the job in response to the polling request.

The computer 4 then starts analysing the received job data. On the basis of the job data, the (program on the) computer 4 figures out the kind of tasks it will need to execute. Before executing the first module of the job, computer 4 sends a request to dispatcher 3 to verify the usage rights. In particular, dispatcher 3 is requested to verify whether the entities involved when the module would be executed (the processing circuitry, the module and the files) are subject to any usage restrictions with regard to other entities. As an example, the usage right for the processing circuitry may be defined to allow use of file #1 when executing a module but not allow the use of file #2.

Assuming that the first module to be executed requires the use of file #1, the verification process at the dispatcher responds that the usage rights are met if the usage rights of file #1 also permit the processing circuitry to use this file #1. Only when the usage rights are mutually met, computer 4 may subsequently process the module.

For a next module to be executed, a new request to verify usage rights for the involved entities is transmitted to the dispatcher 3. Assuming now that file #2 is required in executing the module, verification at the dispatcher 3 will trigger a response that the usage rights are not met (this is regardless of the setting of the usage rights whether file #2 would allow use by the processing circuitry, since it was already presumed that the processing circuitry was not allowed to use file #2). Accordingly, the module using file #2 will not be processed.

In the embodiment of FIG. 3, the dispatcher 3 verifies for each module and/or file(s) if execution of the module is allowed to be executed by the processing circuitry. As mentioned previously, the verification of usage rights may alternatively be performed by the computer 4.

Figures 4A, 4B:
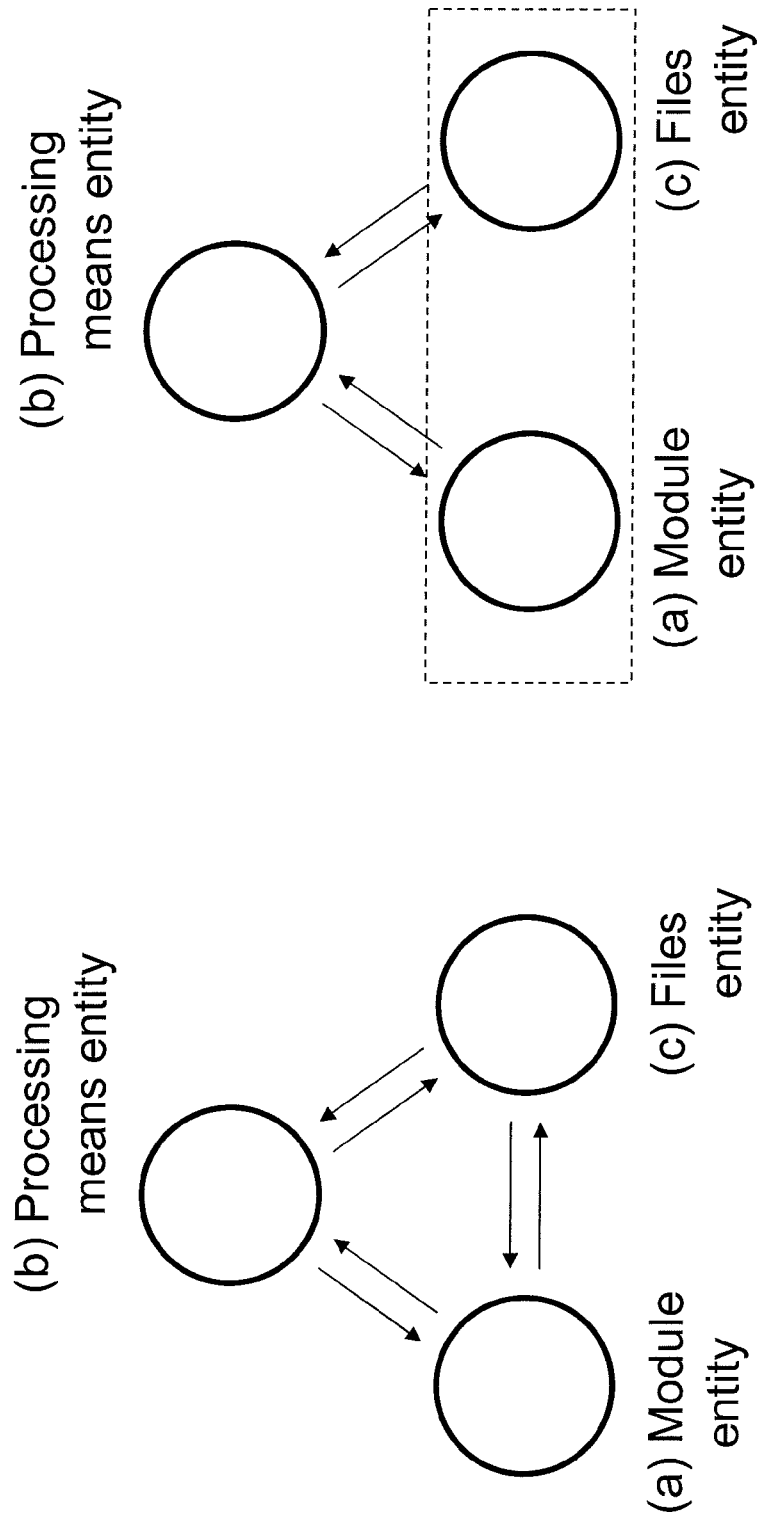
FIGS. 4A and 4B schematically illustrate entities and the mutual usage rights existing between the entities.

FIGS. 4A and 4B are general representations of entities in the database 2 between which mutual usage rights have been defined (indicated by the arrows). Whereas in FIG. 4A, mutual usage rights are defined between all entities ((a) module, (b) processing circuitry and (c) files), FIG. 4B is an example wherein mutual usage rights are only defined between a part of the entities (viz. between the module entity and the processing circuitry entity and between the files entity and the processing circuitry entity) and omitted between other entities (viz. between the module entity and the files entity). The module entity and files entity in FIG. 4B are combined in an execution container. While the embodiment of FIG. 4B does not allow control over the use of files by the module and over the use of a module by a file, the embodiment of FIG. 4B is beneficial in that usage right verification is faster.

In the remainder of the description, it will be assumed that the configuration of FIG. 4B applies.

Figure 5:
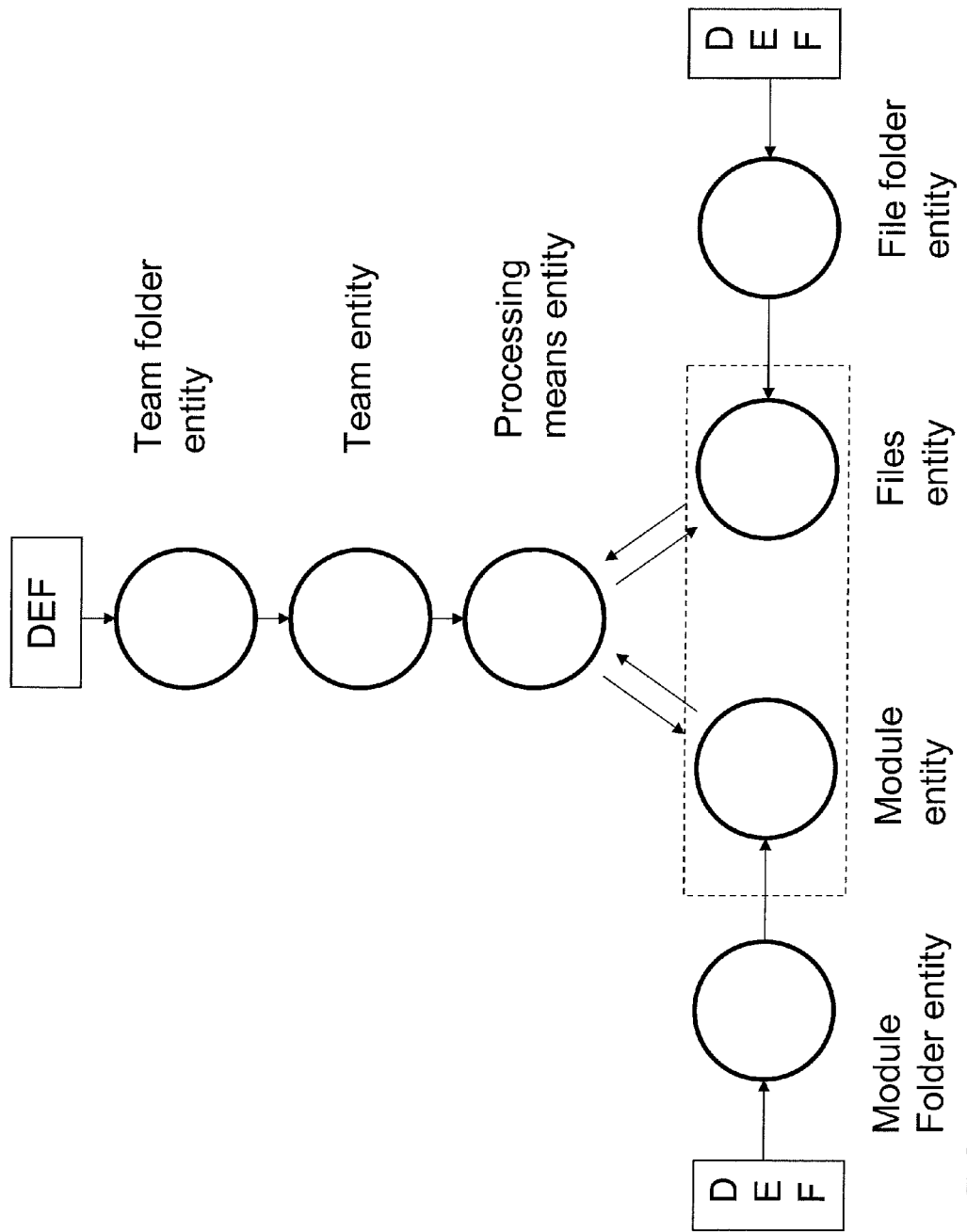
FIG. 5 is a schematic illustration of entities comprising multiple levels.

The entities as illustrated in FIGS. 4A and 4B may comprise a plurality of levels and may be configured in a hierarchical structure of child levels and parent levels. The below table provides an example of various entity levels which are also depicted in FIG. 5.

|  | Entity | | |
|---|---|---|---|
|  | Parent [1] Entity | Parent [n] Entity | Root Entity (highest level) |
| Processing circuitry | Team | Team Folder | Teams |
| Module | Module Folder | Module Folder | Modules |
| File | File Folder | File Folder | Files |

A processing circuitry can be assigned to a "Team" that in turn can be part of a "Team Folder". All team folders are stored in the root folder "Teams". The processing circuitry can be assigned to multiple teams.

A similar configuration applies to the module and files entities.

The definition of usage rights can be made on every level. In one embodiment, the default setting (indicated as DEF in FIG. 5) at the highest level is that the entity allows use by other entities. If no usage rights deviating from DEF are defined at lower levels, the DEF applies to all levels. This implies that the usage rights do not disable execution of any module. On lower levels, usage rights may override the default "allow" usage rights.

The processing circuitry (agents) can be assigned to multiple teams T.

In another embodiment, each level may have an individual default usage right.

FIGS. 6A-6D provide a schematic illustration of usage right verification with multi-level entities. In these figures, the left hand entity is the processing circuitry entity with levels A (agent), T (team) and two TF levels (team folder). The right hand branch relates to the module entity comprising levels M (module) and three MF levels (module folder). The verification process verifies the setting of user rights bottom up for both the left hand and right hand side to verified mutual usage rights. FIGS. 6A-6D only show the left hand side verification.

Figure 6A:
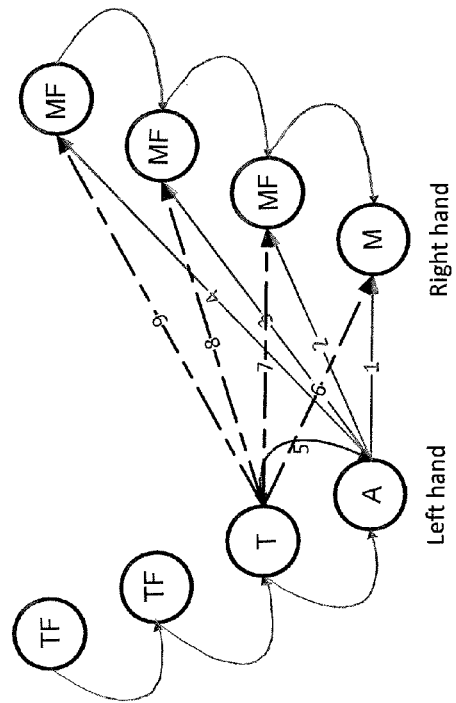
FIGS. 6A-6D show various steps in the verification of usage rights between two multi-level entities in accordance with an embodiment of the invention.
Figure 6B:
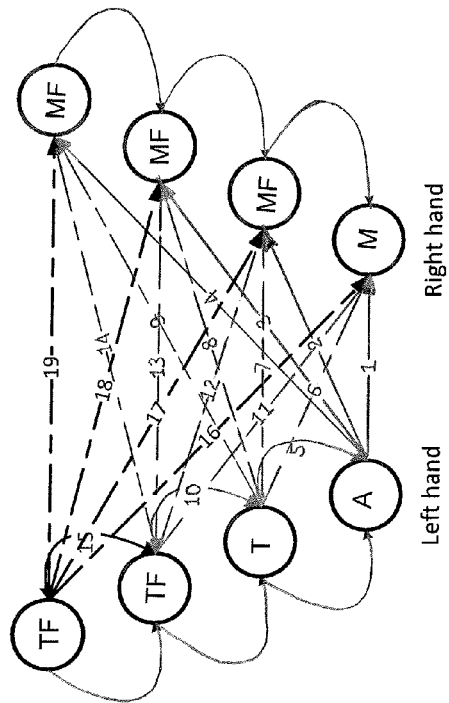
Figure 6C:
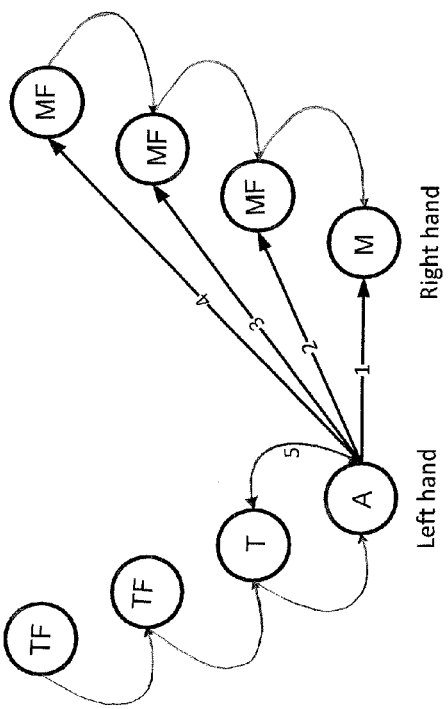
Figure 6D:
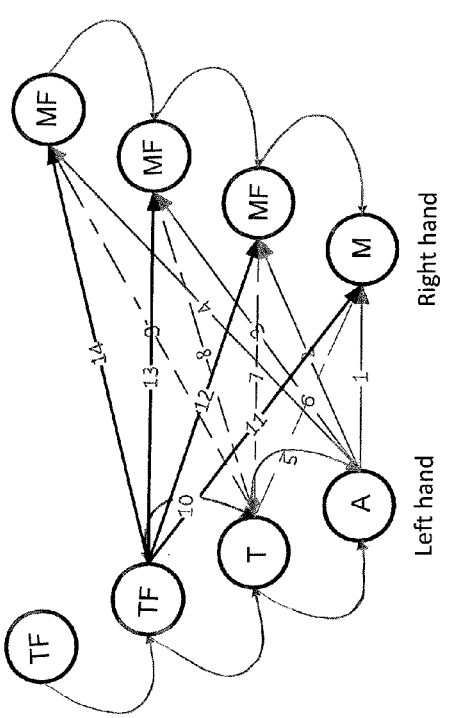

In the first verification step of FIG. 6A, the usage right settings are verified between the agent A and the module M. If no disabling setting of usage rights is found, the second step involves the verification of the setting of usage rights between agent A and the module folder MF. Again, if no disabling usage right setting is found, the higher level module folders MF are verified. If there is no denied outcome in the setting for the agent A against any of the levels of the module entity, a subsequent set of verifications is performed from the team folder T as illustrated in FIG. 6B. If these verification steps do not result in a disabling outcome, still higher levels of the processing circuitry module are verified as illustrated in FIGS. 6C and 6B. When the verification process does not result in any denied usage right outcome, the default DEF will be applied (e.g. usage of all entities is allowed). When the verification result of both branches does not comprise a usage right not allowing use of a particular entity, the module will be executed.

In some cases, the mutual usage right verification may take considerable processing time. For example, in the case of FIGS. 6A-6D, a considerable number of verification steps need to be taken before an outcome on the usage rights is obtained. Since any denied usage right in any level of the entity is sufficient to disable execution of the module, it is beneficial to start the verification procedure from the entity with the lowest number of levels in case the number of levels for the respective entities is different. If verification of one of the entities yields a denied usage rights, verification from the other entity is not longer needed and the thread for this verification can be cancelled.

In one embodiment, one or more optimization measures may be taken relating to at least one of the caching of the entity structures, the usage right settings for one or more of the entities and the results of the user right verifications. Caching may improve the verification rate of usage rights. In one embodiment, caching of one or more of the above identified information may be done in the dispatcher 3.

One or more entity folders may be cached because changes on folders will not be performed frequently. In one embodiment, the folders that are cached are team folders, module folders and file folders. If a folder is added or changed position from a console 5A-5C, a trigger is provided to the dispatcher 3. The dispatcher 3 will evaluate which folder type has changed and notifies the usage right verification component 12 to update the correct folder tree.

Similarly, the usage rights defined for the entities may be cached. The usage rights can be defined in dictionaries, i.e. a part of the cache contain previously retrieved rules. instead of performing queries on the database 2 for verifying user rights between entities. If there are changes in the usage rights, the dispatcher 3 will get a notification and notify the usage right verification component to update the usage rights for the entities.

Furthermore, the results of the usage right verification may also be cached.

Finally, some use cases will be described for the computer system 1 in accordance with embodiments of the invention with reference to FIGS. 7 and FIGS. 8A-8B. It is assumed that the (a) modules, (b) processing circuitry and (c) files are owned by different users. The ownership by a user is verified when a user logs in onto a console 5A-5C and provides credentials to verify the access rights of the user.

A first user may subsequently set usage rights of the modules using console 5A in relation to the processing circuitry and the files. In particular, the first user may determine which module(s) may be used by which processing circuitry and may make use of which file. A second user may subsequently set usage rights of the processing circuitry using console 5B in relation to the modules and the files. In particular, the second user may determine which processing circuitry may make use of which module and may process which file. A third user may subsequently set usage rights of the files using console 5C in relation to the module and the processing circuitry. In particular, the third user may determine which files can be used by which module and by which processing circuitry.

Figure 7:
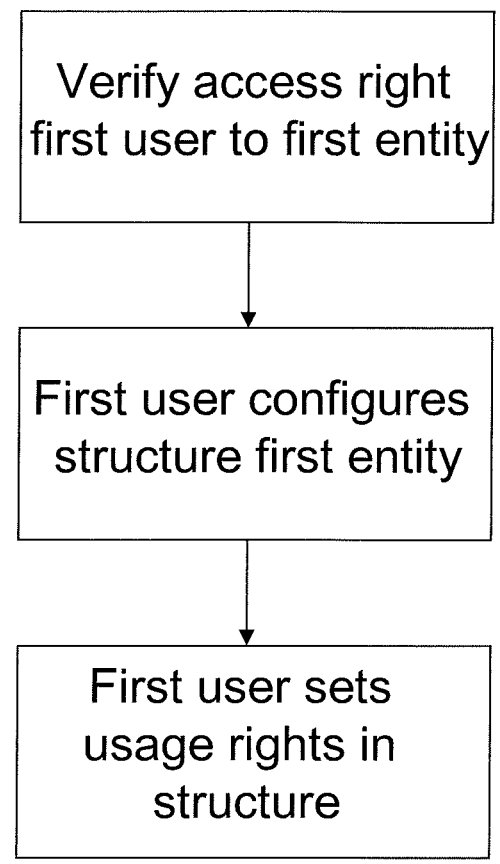
FIG. 7 is a flow chart illustrating various steps of a user to define usage rights for an entity with user-configured levels.

The setting of usage rights may be a two-step process, as is illustrated by the last two blocks in FIG. 7. In a first step a folder structure is defined by the user owning an entity. In a second step, usage rights are set in this folder structure, making use of the hierarchy and of concepts as inheritance.

Figure 8A:
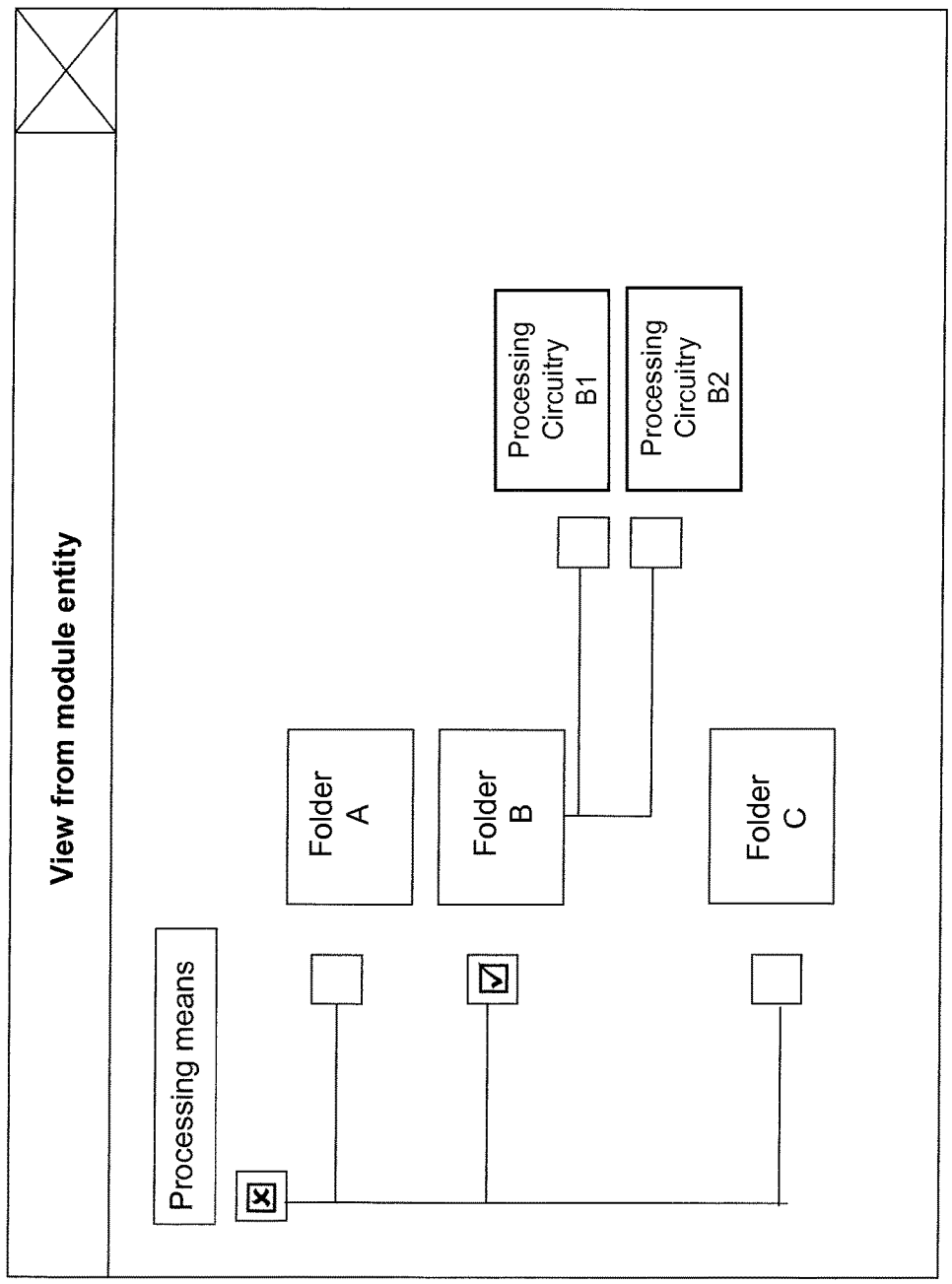
FIGS. 8A-8B show exemplary cases of application of an embodiment of the invention applying a folder structure.
Figure 8B:
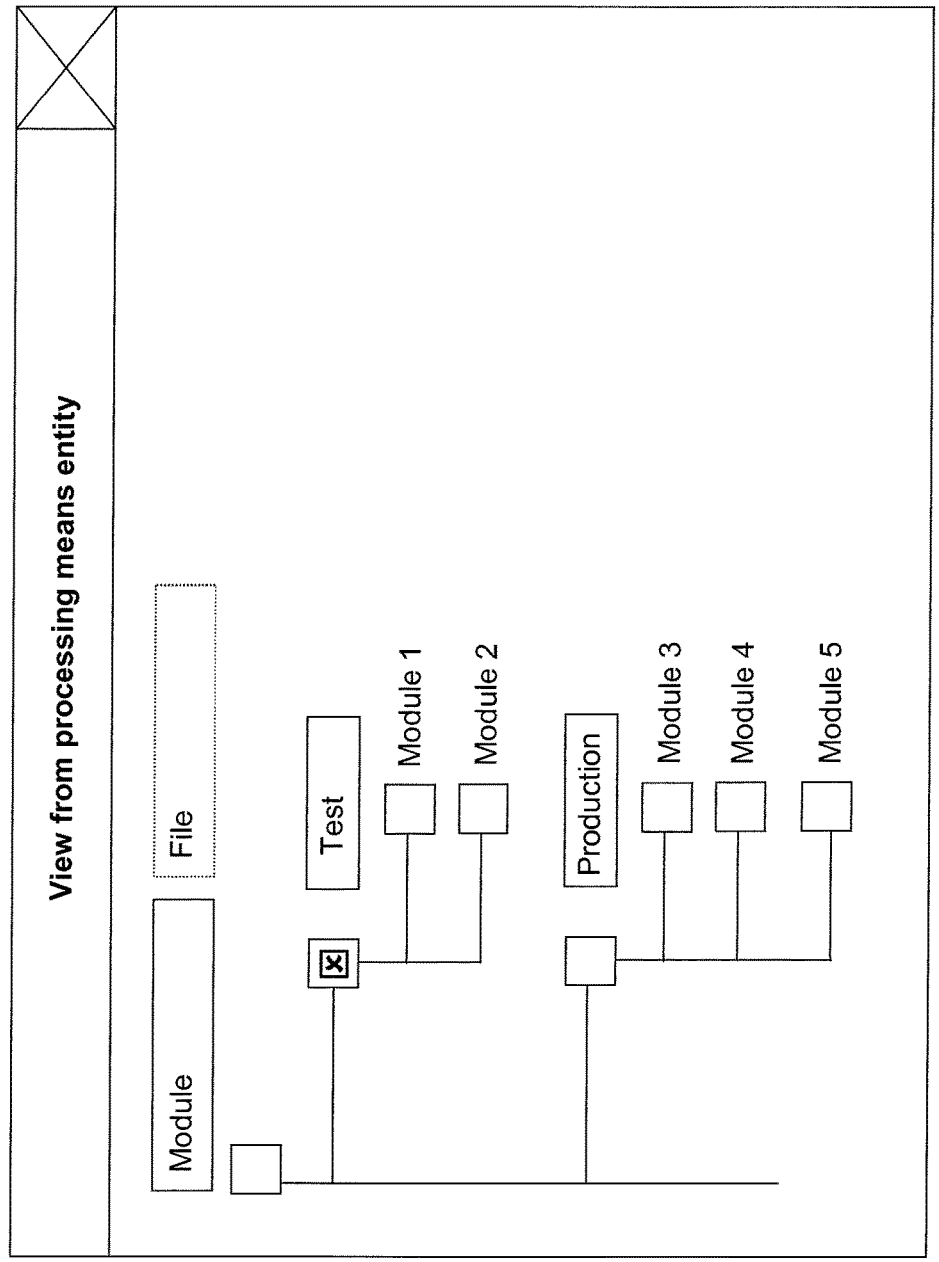

The users can set usage rights on the processing circuitry, team folders, teams, files, file folders, modules and module folders by using usage right tabs in a user interface as shown in FIGS. 8A and 8B.

When setting usage rights for the team folder, the team or the processing circuitry, the usage right tab is divided into "Modules" and "Files". These tabs allow a user to set the usage rights for the module folders, the modules, the file folders and the files.

When setting usage rights for the files folder, the files, module folder or the module, the usage right tab allows a user to set usage rights for team folders, teams and the processing circuitry.

Access to the usage right tabs may be governed by the access rights of the user.

Users can use a plurality of settings when configuring the usage rights:

Do not trust ☒ : if this setting is selected, the select entity is not trusted. For example, if the module "Delete job results" is set not to be trusted by a particular processing circuitry, execution of the module will be disabled when the processing circuitry is scheduled to execute that module.

Trust ☑ : if this setting is selected, the selected entity is trusted. Depending on whether mutual trust setting exist, processing of the module involving the entities to which the trusts apply is enabled. For example, if a trust is set to a specific module and it is specified that a particular processing circuitry is trusted by that module, the agent is allowed to process the module.

Usage rights (also referred to as trusts above), can be inherited in multi-level entities or be made explicit.

FIG. 8A shows a user interface on console 5A wherein the user owning a particular module sets usage rights of that module by selected processing circuitry. Since the situation of FIG. 4B applies, usage right of the module can only be defined with respect to the processing circuitry (and not with respect to the files). Therefore, the only usage right tab is the processing circuitry tab (the only "view" the module has in FIG. 4B is the processing circuitry).

The user has configured a folder structure as depicted in FIG. 8A, wherein the processing circuitry is divided in team folders A-D with a team root. By marking the team root by ☒, none of the processing circuitry of any of the team folders is allowed to use the module owned by the user. The empty boxes for team folders A, C and D indicate that the explicit setting ☒ in the root is inherited for these teams. For team folder B, the setting is over-overruled by setting that the processing circuitry of team folder B is allowed to use the module (indicated by ☑ ). This setting is inherited by the processing circuitry B 1 and B2. Thus, in the example of FIG. 8A, the owner of the module determines that only the processing circuitry configured under team folder B are allowed to use the module.

FIG. 8B shows a user interface on console 5B wherein the user owning a particular processing circuitry sets usage rights of the processing circuitry by selected modules and/or resources. Since the situation of FIG. 4B applies, usage right of the processing circuitry can be defined with respect to the module and with respect to the file(s). Therefore, in FIG. 8B two usage right tabs are depicted, one with respect to the module (the contents of which is shown in FIG. 8B because the tab is selected) and one with respect to the file(s) (the content of which is not shown because the tab is not selected).

The user has configured a folder structure as depicted in FIG. 8B, wherein the modules are divided into a module folder Test and a module folder Production. The module folder Test contains modules #1 and #2. These modules comprise program instructions under test and should not be allowed to be used by anyone. Therefore, the processing circuitry is set not to allow using all modules in the module folder Test, as indicated by ☒ . In contrast, the modules #3, #4 and #5 have been tested appropriately and can be used by the processing circuitry. Therefore the default setting applies allowing such use.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media () e.g., flash memory, floppy disks within a diskette drive or hard-disk drive or any type of solid-state random-access semiconductor memory) on which alterable information is stored.

Embodiments of the present invention can be implemented as hardware, software or a combination thereof.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A computer-implemented method for enabling and disabling execution of at least one module by a processing circuitry configured for executing the module, the module comprising one or more computer instructions configured to use one or more files and the processing circuitry being configured to access the one or more files when executing the module, the method comprising:

associating usage rights with at least a first entity and a second entity, the first entity and second entity being selected from different ones of the module, the processing circuitry and the one or more files;

enabling execution of the module when the associated usage rights allow both use of the first entity by the second entity and use of the second entity by the first entity;

disabling execution of the module when the associated usage rights prevent use of the first entity by the second entity;

disabling execution of the module when the associated usage rights prevent use of the second entity by the first entity;

wherein a first party having ownership of the first entity has defined usage rights with respect to the use of the first entity by the second entity;

wherein a second party having ownership of the second entity has defined usage rights with respect to the use of the second entity by the first entity; and wherein at least one entity of the first entity and the second entity comprises a plurality of levels and the usage right associated with the at least one entity applies to one or more of the levels.

2. The computer-implemented method according to claim 1, wherein access to the first entity is obtained by verifying a first access right assigned to a first user and access to the second entity is obtained by verifying a second access right assigned to a second user, wherein the first access right and the second access right are different access rights.

3. The computer-implemented method according to claim 2, further comprising:
accessing the first entity and defining the usage rights for the first entity after verification of the first access right of the first user;
accessing the second entity and defining the usage rights for the second entity after verification of the second access right of the second user.

4. The computer-implemented method according to claim 1, further comprising determining enabling or disabling of execution of the module by:
configuring the one or more levels of the first entity;
assigning usage rights to the one or more configured levels by a first user.

5. The computer-implemented method according to claim 1, wherein the levels of the first entity comprise at least a parent level and a child level, and comprising:
verifying usage rights between the child level of the first entity and the one or more levels of the second entity to obtain a verification result;
only when the verification result indicates that the usage rights on the child level allow both use of the first entity by the second entity and use of the second entity by the first entity, verifying usage rights between the parent level of the first entity and the one or more levels of the second entity.

6. The computer-implemented method according to claim 5, wherein the number of levels of the first entity and the second entity is different, further comprising starting the verification of usage rights from the at least one entity with a lowest number of levels.

7. The computer-implemented method according to claim 1, wherein verification of the usage rights associated with the first entity and second entity is performed upon execution of the module.

8. A computer program product for enabling and disabling execution of at least one module by processing circuitry configured for executing the module, the module comprising one or more computer instructions configured to use one or more files and the processing circuitry being configured to access the one or more files when executing the module, the computer program product being implemented on computer-readable non-transitory storage medium and, the computer program product configured to, when run on a computer system having a processor, execute a method comprising:
associating usage rights with at least a first entity and a second entity, the first entity and second entity being selected from different ones of the module, the processing circuitry and the one or more files;
enabling execution of the module when the associated usage rights allow both use of the first entity by the second entity and use of the second entity by the first entity;
disabling execution of the module when the associated usage rights prevent use of the first entity by the second entity;
disabling execution of the module when the associated usage rights prevent use of the second entity by the first entity;
wherein a first party having ownership of the first entity has defined usage rights with respect to the use of the first entity by the second entity;
wherein a second party having ownership of the second entity has defined usage rights with respect to the use of the second entity by the first entity; and
wherein at least one entity of the first entity and the second entity comprises a plurality of levels and the usage right associated with the at least one entity applies to one or more of the levels.

9. A computer system configured to enable and disable execution of at least one module by processing circuitry configured to execute the module, the module comprising one or more computer instructions configured to use one or more files and the processing circuitry being configured to access the one or more files when executing the module, wherein the system comprises at least one processing unit having a processor and memory operably coupled to the processor, the at least one processing unit comprising:
an association component configured to associate usage rights with at least a first entity and a second entity in a database, the first entity and second entity being selected from different ones of the module, the processing circuitry and the one or more files;
a usage right verification component configured to:
enable execution of the module when the associated usage rights allow both use of the first entity by the second entity and use of the second entity by the first entity;
disable execution of the module when the associated usage rights prevent use of the first entity by the second entity; and
disable execution of the module when the associated usage rights prevent use of the second entity by the first entity;
wherein a first party having ownership of the first entity has defined usage rights with respect to the use of the first entity by the second entity;
wherein a second party having ownership of the second entity has defined usage rights with respect to the use of the second entity by the first entity; and
wherein at least one entity of the first entity and the second entity comprises a plurality of levels and the usage right associated with the at least one entity applies to one or more of the levels.

10. The computer system according to claim 9, wherein the at least one processing unit further comprises at least one access right verification component configured to verify a first access right of a first user to the first entity and to verify a second access right of a second user to the second entity, wherein the first access right and the second access right are different access rights.

11. The computer system according to claim 10, wherein the at least one processing unit further comprising a first usage right definition component to define usage rights for the first entity after verification of the first access right of the first user and a second usage right definition component configured to define the usage rights for the second entity after verification of the second access right of the second user.

12. The computer system according to claim 9, wherein the at least one processing unit further comprises an entity level configuration component configured to configure the one or more levels of the first entity by a first user, wherein the association component is further configured to associate usage rights to the one or more user-configured levels.

13. The computer system according to claim 9, wherein the levels of the first entity comprise at least a parent level and a child level, and wherein the usage right verification component is further configured to:

verify usage rights between the child level of the first entity and the child level of the second entity and obtain a verification result;

only when the verification result indicates that the usage rights on the child level allow both use of the first entity by the second entity and of the second entity by the first entity, verify usage rights between the parent level of the first entity and the child level of the second entity.

14. The computer system according to claim 13, wherein the number of levels of the first entity and the second entity is different, wherein the usage right verification component is configured to start the verification of usage rights from the entity with a lowest number of levels.

15. The computer system according to claim 9, wherein the usage right verification component is triggered to start verification of the usage rights associated with the first and second entity upon execution of the module.

\* \* \* \* \*